(12) United States Patent
Ezra et al.

(10) Patent No.: US 11,979,301 B2
(45) Date of Patent: May 7, 2024

(54) ENHANCING PERFORMANCE IN NETWORK-BASED SYSTEMS

(71) Applicant: Intel Corporation, Santa Clara, CA (US)

(72) Inventors: Asaf Ezra, Tel Aviv (IL); Tal Saiag, Tel Aviv (IL); Ron Gruner, Tel Aviv (IL)

(73) Assignee: Intel Corporation, Santa Clara, CA (US)

(*) Notice: Subject to any disclaimer, the term of this patent is extended or adjusted under 35 U.S.C. 154(b) by 26 days.

(21) Appl. No.: 17/239,673

(22) Filed: Apr. 25, 2021

(65) Prior Publication Data

US 2021/0281496 A1 Sep. 9, 2021

Related U.S. Application Data

(63) Continuation of application No. 16/808,469, filed on Mar. 4, 2020, now Pat. No. 11,018,957.

(51) Int. Cl.
*H04L 41/5054* (2022.01)
*G06F 9/52* (2006.01)
*H04L 41/14* (2022.01)
*H04L 67/10* (2022.01)

(52) U.S. Cl.
CPC .......... *H04L 41/5054* (2013.01); *G06F 9/526* (2013.01); *H04L 41/14* (2013.01); *H04L 67/10* (2013.01)

(58) Field of Classification Search
CPC .. H04L 41/5012; H04L 41/5051; H04L 43/10
See application file for complete search history.

(56) References Cited

U.S. PATENT DOCUMENTS

| 9,300,728 B1* | 3/2016 | Ananchaperumal ......................... H04L 67/1001 |
| 10,523,712 B1* | 12/2019 | Huang ..................... H04L 63/20 |
| 10,552,121 B1* | 2/2020 | Ganeshmani ............. G06F 8/30 |
| 10,715,687 B2* | 7/2020 | Hayashi ............. H04N 1/00344 |
| 10,754,683 B1* | 8/2020 | Kahn ..................... G06F 9/5011 |
| 11,018,957 B1* | 5/2021 | Ezra ..................... G06F 9/5072 |
| 2003/0135609 A1* | 7/2003 | Carlson ............... H04L 67/1097 709/224 |

(Continued)

OTHER PUBLICATIONS

"U.S. Appl. No. 16/808,469, Non Final Office Action dated Nov. 25, 2020", 10 pgs.

(Continued)

*Primary Examiner* — Shean Tokuta
(74) *Attorney, Agent, or Firm* — Schwegman Lundberg & Woessner, P.A.

(57) ABSTRACT

A method, system, and computer program product, the method comprising: obtaining a data path representing flow of data in processing a service request within a network computing environment having system resources; analyzing the data path to identify usage of the system resources required by the service request processing; determining, based on the usage of the system resources, an optimization action expected to improve the usage of the system resources; and implementing the optimization action in accordance with the data path, thereby modifying operation of the cloud computing environment in handling future service requests.

18 Claims, 7 Drawing Sheets

(56) References Cited

U.S. PATENT DOCUMENTS

| | | | | |
|---|---|---|---|---|
| 2009/0138682 | A1* | 5/2009 | Capps, Jr. | G06F 11/3466 712/220 |
| 2013/0024731 | A1* | 1/2013 | Shochat | G06F 11/3612 714/38.1 |
| 2013/0074090 | A1* | 3/2013 | Kumar | G06F 9/505 718/104 |
| 2014/0123151 | A1* | 5/2014 | Kishan | G06F 9/4881 718/103 |
| 2014/0303933 | A1* | 10/2014 | Simitsis | G06Q 10/063 702/181 |
| 2015/0195182 | A1* | 7/2015 | Mathur | G06F 11/2289 714/27 |
| 2016/0062746 | A1* | 3/2016 | Chiosi | H04L 41/0843 717/104 |
| 2016/0224377 | A1* | 8/2016 | Farhan | G06Q 10/06 |
| 2016/0246652 | A1* | 8/2016 | Herdrich | G06F 9/5077 |
| 2017/0272371 | A1* | 9/2017 | Lin | H04L 67/00 |
| 2019/0102500 | A1* | 4/2019 | Sinclair | G06F 8/41 |
| 2020/0089538 | A1* | 3/2020 | Cherniavsky | G06F 9/5011 |
| 2020/0136994 | A1* | 4/2020 | Doshi | G06F 9/5072 |
| 2020/0210312 | A1* | 7/2020 | Powers | G06F 11/3471 |
| 2020/0252317 | A1* | 8/2020 | Westlin | H04L 43/10 |
| 2020/0314171 | A1* | 10/2020 | Featonby | G06F 9/45558 |
| 2020/0336415 | A1* | 10/2020 | Dowlatkhah | H04L 41/509 |
| 2021/0200589 | A1* | 7/2021 | Jain | G06F 9/505 |
| 2021/0281496 | A1* | 9/2021 | Ezra | H04L 67/5681 |

OTHER PUBLICATIONS

"U.S. Appl. No. 16/808,469, Notice of Allowance dated Feb. 19, 2021", 10 pgs.

"U.S. Appl. No. 16/808,469, Response filed Jan. 14, 2021 to Non Final Office Action dated Nov. 25, 2020", 10 pgs.

\* cited by examiner

ENHANCING PERFORMANCE IN NETWORK-BASED SYSTEMS

CROSS-REFERENCE TO RELATED APPLICATION

This application is a continuation of, and claims priority from, U.S. patent application Ser. No. 16/808,469, titled "ENHANCING PERFORMANCE IN NETWORK-BASED SYSTEMS", filed Mar. 4, 2020, which is incorporated herein by reference in its entirety without giving rise to disavowment.

TECHNICAL FIELD

The present disclosure relates to cloud-based computing systems in general, and to a method and apparatus for enhancing performance in network-based computing systems, in particular.

BACKGROUND

Network-based computing, may refer to networks providing computing services, whether on-premise or remote. The term cloud-based refers to a network that is remote from the consumers, however, it may also be used for an on-premise network. Network-based computing provides shared resources, software, and information to client computers and other devices on demand, as with an electricity grid. Customers can thus consume a plurality of resources as a service and be charged, whether internally or to a third party, only for their actual usage. In addition, increased high-speed bandwidth makes it possible to achieve high level of service, including fast turn-around of responses from centralized infrastructure. In general, cloud computing customers need not own the physical infrastructure, and avoid capital expenditure by renting usage time from a third-party provider instead. It is noted that a cloud-computing environment may be provided by a third-party (e.g., "in the cloud"), may be owned and provided by the entity utilizing it (e.g., "on premise"), or the like. Cloud computing may be used for providing products, services and solutions to organizations or consumers over the Internet. Typically, cloud computing services are dynamic and fine-grained or "elastic", meaning that the service provisioning scales with the number or complexity of users accessing the cloud services.

Cloud computing or on-premise network systems may provide services at different levels, ranging for example between a platform for a customer to install and use his own application, through providing a storage system accessible via the Internet, to providing any other computing services of any required complexity.

By using virtualization technologies, a cloud computing or on-premise node may provide a large number of virtualized data processing systems, and the network may consist of even hundreds of thousands of virtualized nodes running on tens of thousands of physical cloud computing nodes. Thus, the size of a network, generally referred to as a cloud computing or on-premise network or environment, is practically unlimited.

For the clients of the cloud computing providers or of on-premise networks, there is a constant desire to receive an improved performance and fast turnaround time for processing service requests. Therefore, it is constantly required to enhance the performance of cloud computing systems and make the service provisioning more efficient and effective, adhering to desired Service Level Agreements (SLAs) for their end-users.

BRIEF SUMMARY

One exemplary embodiment of the disclosed subject matter is a computer-implemented method comprising: obtaining a data path representing flow of data in processing a service request within a network computing environment having system resources; analyzing the data path to identify usage of the system resources required by the service request processing; determining, based on the usage of the system resources, an optimization action expected to improve the usage of the system resources; and implementing the optimization action in accordance with the data path, thereby modifying operation of the cloud computing environment in handling future service requests. The method can further comprise: monitoring continuous usage of the system resources over time; determining a second optimization action other than the optimization action, based on the continuous usage and the data path; and implementing the second optimization action, thereby further modifying operation of the cloud computing environment in handling future service requests. Within the method, the network computing environment optionally comprises a server having an operating system executed therein, wherein the server is optionally involved in the processing of the service request, and wherein the optimization action optionally affects the operating system. Within the method the optimization action is optionally implemented in a kernel space of the operating system or in a user space of the operating system. Within the method, the data path is optionally a representation of how data is moved throughout services in the cloud computing environment. The method is optionally performed by a first computing platform, and the method can further comprise: obtaining a second data path representing flow of data in processing a second service request within a second computing platform of the cloud computing environment having system resources; analyzing the second data path to identify further usage of the system resources required by the second service request processing; determining by a manager application, based on the usage and the further usage, a combined optimization action; and providing the combined optimization action to the computing platform and second computing platform. Within the method, the system resources optionally comprise a lock; and wherein two threads processing service requests of a same type are awaiting the lock at a same stage of processing, the optimization action optionally comprises assigning higher priority in holding the lock to a thread of the two threads that is expected to finish processing earlier, in accordance with the data path. Within the method, the system resources optionally comprise a lock; and wherein two threads processing service requests of a same type are awaiting the lock at different stages of processing, the optimization action optionally comprises assigning higher priority in holding the lock to a thread of the two threads that is expected to finish processing earlier, in accordance with the data path. Within the method, the system resources optionally comprise a lock; and wherein two threads processing service requests of different types are awaiting the lock, the optimization action optionally comprises assigning higher priority in holding the lock to a thread of the two threads that is expected to finish processing earlier, in accordance with the data path. Within the method, the system resources optionally comprise a socket of a first type for two processes to communicate, analysis optionally comprises identifying socket of the first type in which both processes are executed by a same machine, and the optimization action optionally comprises opening a socket of a second type instead of the first type. Within the method, the first type is optionally an INET socket and the second type is optionally a Unix Domain Socket (UDS). Within the method, the system resources optionally comprise a connection point, analysis optionally comprises identifying recurrent connections of an application to a remote server, the connection required at a later time, and the optimization action optionally comprises opening a connection to the remote server ahead of time, and providing the connection to the application when needed. Within the method, the network computing environment is optionally a cloud computing environment. Within the method, the network computing environment is optionally an on-premise computing environment.

Another exemplary embodiment of the disclosed subject matter is a system having a processor, the processor being configured to perform the steps of: obtaining a data path representing flow of data in processing a service request within a network computing environment having system resources; analyzing the data path to identify usage of the system resources required by the service request processing; determining, based on the usage of the system resources, an optimization action expected to improve the usage of the system resources; and implementing the optimization action in accordance with the data path, thereby modifying operation of the cloud computing environment in handling future service requests. Within the system, the processor is optionally further configured to: monitoring continuous usage of the system resources over time; determining a second optimization action other than the optimization action, based on the continuous usage and the data path; and implementing the second optimization action, thereby further modifying operation of the cloud computing environment in handling future service requests. Within the system, the network computing environment optionally comprises a server having an operating system executed therein, the server is optionally involved in the processing of the service request, the optimization action optionally affects the operating system, and the optimization action is implemented in a kernel space or in a user space of the operating system. Within the system, the system resources optionally comprise a lock; and two threads processing service requests are awaiting the lock, the optimization action optionally comprises assigning higher priority in holding the lock to a thread of the two threads that is expected to finish processing earlier, in accordance with the data path. Within the system, the system resources optionally comprise a socket of a first type for two processes to communicate; analysis optionally comprises identifying socket of the first type in which both processes are executed by a same machine, and the optimization action optionally comprises opening a socket of a second type instead of the first type. Within the system, the system resources optionally comprise a connection point, analysis optionally comprises identifying recurrent connections of an application to a remote server, the connection required at a later time, and the optimization action optionally comprises opening a connection to the remote server ahead of time, and providing the connection to the application when needed.

Yet another exemplary embodiment of the disclosed subject matter is a computer program product comprising a non-transitory computer readable medium retaining program instructions, which instructions when read by a processor, cause the processor to perform: obtaining a data path representing flow of data in processing a service request within a network computing environment having system resources; analyzing the data path to identify usage of the system resources required by the service request processing; determining, based on the usage of the system resources, an optimization action expected to improve the usage of the system resources; and implementing the optimization action in accordance with the data path, thereby modifying operation of the cloud computing environment in handling future service requests.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is the need to enhance the performance of cloud computing services provided by a service provider using one or more cloud-based computing platforms. Performance may relate to improved turn-around time from the customer's point of view, and to making effective usage of the available computing platforms and network resources from the provider's point of view. This need is ever growing with the increasing complexity, development agility and constantly changing production of the architecture of applications, which contribute to the growing performance optimization challenge of compute clusters, both on-premise and in the cloud.

Another technical problem dealt with by the disclosed subject matter is the need to provide such service improvements without fine-combing and enhancing the computer code of each specific provisioned service. Such program enhancements may require impossible or infeasible effort, due inter alia to lack of expertise, knowledge, or availability of adequate manpower, the involved expenses, or the like. Moreover, an organization providing or using the service may be reluctant to change production code since such change may also cause undesired effects such as introducing new bugs, reducing performance in other areas of the code, or others.

One technical solution comprises an artificial intelligence (AI) based optimization layer which improves application performance in a network computing environment, by applying dynamic low-level and application-level adaptations to the operating system of one or more computing platforms. The network computing environment may be a cloud computing environment, an on-premise computing environment, a combination thereof, or the like. The solution may comprise agents installed on and executed by one or more servers, such as Linux servers, whether bare-metal or virtual machines, within cloud computing environments such as data centers, multi- or hybrid-cloud environments.

A data path of one or more services handled by the cloud computing environment may be provided to the agents. The data path may be a representation of how data is moved throughout the services in the cloud computing network. It is noted that a data path, unlike a control path, is data-oriented and not operation- or execution-oriented. The data may include, for example, incoming initial requests, data derived therefrom such as responses, fetched pages, or the like. A data path may be described as containing the control flow path initiated by a trigger such as an incoming request, and all sub-flows of the initial trigger, for example derived requests, responses, or the like.

The data path may be collected by one or more agents collecting measurements throughout their operation, such as time information and scale information related to one or more services provisioned by the computing platform. The measurements may relate to user-space and kernel-space, and may he collected by Application Programming Interface (API) calls and hooks, respectively.

Each agent may then analyze the data path and possibly additional real-time measurements and metrics, and identify system and application bottlenecks, including for example resource usage patterns and contentions occurring while processing the service request.

In some exemplary embodiments, the agent may determine, based on the usage and the data paths, an optimization action that is expected to improve the usage of the system resources. Accordingly, the optimization action may be implemented, thereby modifying operation of the cloud computing environment in handling current and future service requests. It is noted that in spite of the term "optimization" used, the optimization actions may provide improvements which may be sub-optimal and better improvements may be feasible. The optimization actions (also referred to as "actions") may be determined by any AI learning techniques, such as but not limited to artificial neural networks, Support Vector Machines (SVM), decision trees, or the like. A prediction model may be trained using past measurements and data paths to provide predictions useful for the disclosed subject matter. In some exemplary embodiments, supervised learning may be employed. Additionally or alternatively, non-supervised or semi-supervised learning may be employed. The actions may relate to one or more aspects of the operating system and applications, including but not limited to the network stack, library and system calls, system scheduler and CPU, disk and memory accesses, or the like.

The actions may then be dynamically applied to modify the operation of the operating system and/or one or more running applications, in user space and/or in kernel space.

In some embodiments, the process may he iterative, and the measurements, action determining and action taking may be repeated, to further enhance the computing performance.

In some embodiments, a manager application installed on one or more computing platforms of the cloud network, may receive actions, metrics or measurements from two or more agents operating on two or more computing platforms. The manager may analyze the actions, metrics or measurements, and may determine further actions to be implemented by one or more of the computing platforms. The manager may then provide the suggested actions to the computing platforms, such that the actions may be implemented by the respective agents. In some cases, information gleaned from one node may be utilized in another node executing the same or similar services. Additionally or alternatively, the optimization actions to he performed may he determined based on a target function relating to an overall performance measurement throughout several nodes (e.g., a global optimization) and not necessarily in each node in a standalone manner (e.g., a local optimization). It will he appreciated that each agent may be operative for improving the performance of the particular node on which it is installed, whether or not one or more managers are installed and operate within the network. In some exemplary embodiments, the agent may operate independently without being connected to a manager application, in a standalone configuration.

In some embodiments, one exemplary action may be changing the standard assignment of priority to threads competing for resources, such as but not limited to obtaining locks, accessing shared memory, or the like. In some exemplary embodiments, the competition may be for resources that may he protected by locks or other Inter Process Communication (IPC) mechanisms. In some embodiments, threads or flows, collectively referred to as threads, which are closer to finish processing may he assigned higher priority, and are thus more likely to get hold of the lock, execute and finish their processing, provide the results if required, and free their resources to other threads of the same or of other processes.

Determining which of competing threads is closer to finishing may he performed using a metric. Non-limiting examples of metrics are discussed. For example, two threads competing for locks of the same resource at different stages of the same processing sequence may be compared according to the stage in the processing, such that the thread that is in the more advanced stage gets higher priority. In another example, two threads competing for the same lock at the same stage of the same processing sequence, may be compared by the amount of data each thread processes, such that the one with the larger amount gets higher priority. In further embodiments, the threads may be compared in accordance with their execution time up to that point, such that the older thread gets the higher priority, or the like. In yet another example, two threads performing different processing and requiring locks of the same resource, may be compared according to their respective expected times until their respective processing is finished, such that the thread that is closer to finishing gets higher priority. Alternatively, the thread that has performed more processing until that point in time gets lower priority since it may be assumed that it is a heavier process. In another alternative this process may be assigned higher priority, assuming it has finished a larger part of its processing.

In some embodiments, another exemplary action may be changing the type of an opened connection point. Analyzing the data path may detect opening a connection of a first type which is intended for communication between processes executed by two machines, while in fact the two processes are executed by one machine. An action may be taken in such cases, which comprises opening a connection point of another type, suitable for communicating within the same machine, which has less overhead and is more efficient. For example, programmers sometimes prefer using internet sockets (INET sockets) as an entry point to their applications, since it is a more portable way of communicating between any two processes then other mechanisms. However, using INET sockets for communication when the two processes are running on the same host which his less efficient than opening a Unix Domain Socket (UDS). Thus, in cases in which it is known that the communication is within the same host, INET sockets may be substituted by UDSs for inter-process communications. Since UDS are more efficient than INET sockets, using UDS improves the performance of each of the communicating processes, without requiring any further effort, such as changing the application code, restarting the application or the OS, or the like, and having no negative effect on any of the communicating processes. It is also noted that no portability issue arises, as the optimization action is implemented at an already deployed service. If the same code is re-deployed so that the two processes are not executed in the same machine, then the code will work correctly, and the optimization action will simply not be implemented in such a configuration.

In some embodiments, another exemplary action may be pre-opening a connection point, such as a TCP connection. Analyzing the data path may detect once or recurrently opening connections by an application, possibly for a short communication for example up to a predetermined volume of data, to a remote server and then closing them. A possible action may be creating an out-bound connection, possibly ahead of time, maintaining it until required, and optionally re-using it one or more times before closing. For example, a TCP connection to a remote server may require at least a SYN packet to be sent by the initiator, and a SYN-ACK response to be sent back, thus taking at least a round-trip time. For short connections, forming the connection may take up as much time as the entire connection duration, which constitutes significant overhead in time-sensitive applications. Thus, in some embodiments, outbound connections may be tracked, in order to detect reoccurring connections. For such connections, connected sockets with the relevant IP and port combinations may be prepared, and may be provided to the application when a connection is required. This preparation as well as reusing the connection before closing it can provide for saving the time for establishing each one or more connections, one or more times.

One technical effect of the disclosure is the provisioning of a method and apparatus for enhancing performance of an instance or server within a cloud computing or on-premise network. In some exemplary embodiments, the enhancement may not introduce changes to any of the applications, but rather to the operating system. Thus, any existing or newly installed application can benefit from the modifications.

Another technical effect of the disclosure is that as implementations of the method and apparatus evolve, further events or situations of suboptimal resource usage may be detected, and further corresponding actions may be suggested and implemented. Thus, the performance of applications may be improved without even having to stop and restart any of the applications.

As yet another technical effect of the disclosed subject matter may be application-agnostic and platform-agnostic resource utilization optimizations, enabling code to be re-deployed and migrated to different platforms without adverse effects of the previously implemented optimization. The programmer coding the application may focus on the business logic, while allowing for agnostic optimizations to occur at the level of the Operating System. Even further, the optimization of the Operating System creates an automatically adapted operating system that is specifically tailored and optimized for the application. It is further noted that OS-based improvements may implement functionality that the user-level code cannot achieve, such as manipulating thread scheduling.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Figure 1:
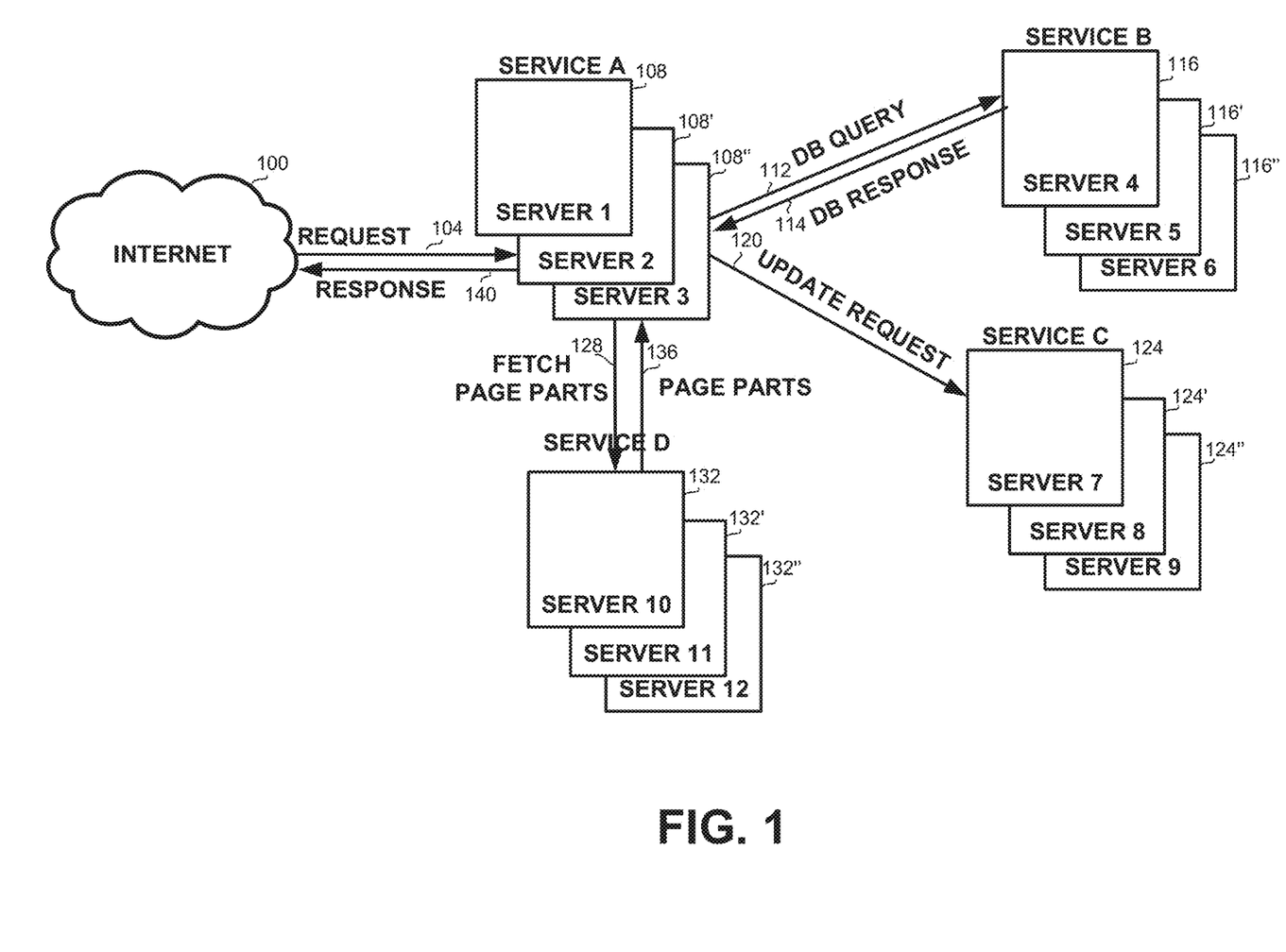
FIG. 1 shows a graph representation of a data path, in accordance with some exemplary embodiments of the disclosed subject matter.
Figure 2:
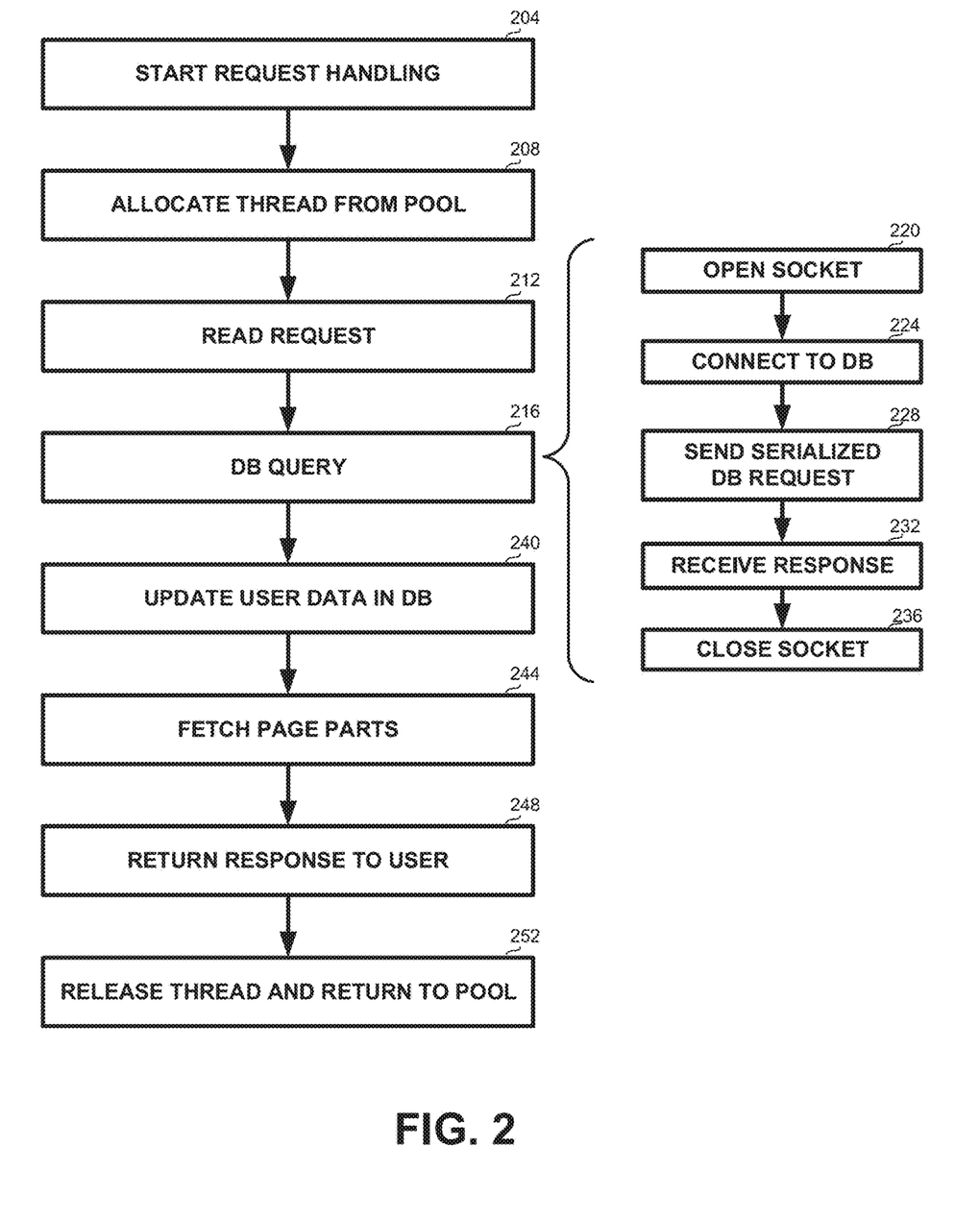
FIG. 2 shows a flowchart representation of the data path of FIG. 1, in accordance with some exemplary embodiments of the disclosed subject matter.

Referring now to FIG. 1, showing a graph representation of a data path of a particular service or application, and to FIG. 2 showing a flowchart representation of the data path.

The data path may represent a query being issued to a database, updating the details of the user in the database, and providing page parts in response. Thus, a service request for service A may be received from a client device (not shown) through the Internet 100 to a server providing service A, which is one of server 1 (108), server 2 (108') or server 3 (108"). The server that received the request can then start handling (204) the request, may allocate (208) a thread from a thread pool, and read (212) the request.

The server providing service A can then issue a database (DB) query 112 to a server providing service B, which is one of server 4 (116), server 5 (116') or server 6 (116"), wherein service B may be the database.

Handling (216) the DB query may comprise opening a socket (220), connecting to the DB (224), sending a serialized DB request (228), receiving (232) a response 114 from the DB, and closing the socket (236).

The server providing service A may then send a user data update request 120 to a server providing service C, such as server 7 (124), server 8 (124') or server 9 (124"). The update request may comprise details of the user, and service C can be updating the DB accordingly. The update request may be handled (240) in an analogous manner to the handling (216) of DB query 112 described above.

The server providing service A may then send a fetch request 128 to a server providing service D, such as server 10 (132), server 11 (132') or server 12 (132"). Service D may be fetching page parts. The fetch request may be handled (244) in an analogous manner to handling (216) of DB query 112 described above.

Response 136 may then be returned to the first server, and a response 140 based on response 136 may be returned (248) via Internet 100 to the user. The thread may be released and returned to the pool (252).

Thus, the data path demonstrates the passage and transmission of data within the system, starting with request 104, DB query 112, DB response 114, update request 120, fetch request 128, response 136 and response to user 140.

It is also noted that in an event of a loop in the control-flow, the data flow may not necessarily exhibit a loop as well. In the data flow, the control-flow loop may be represented by different data-related phases of gathering and processing data. Specifically, as the data that is gathered by the process in an iteration of the loop is available for the process in the next iteration, the data path may be advancing in each iteration. As an example, control flow graph may exhibit a loop in which several process may commence. However, the data flow of the processing may be first performing a first process in the first iteration, performing a second process in the second iteration and performing a third process in the third iteration. Hence, according to the data path, there may be no loop, but instead a sequential flow. In some exemplary embodiments, the data path may map a same node in the control flow graph with different nodes in the data path, based on the different data that exists when the node in the control flow graph is executed.

The data path can be analyzed for performance harming events or situations involving system resources such as locks, inter-process communication requests, short connections, or the like.

Figure 3:
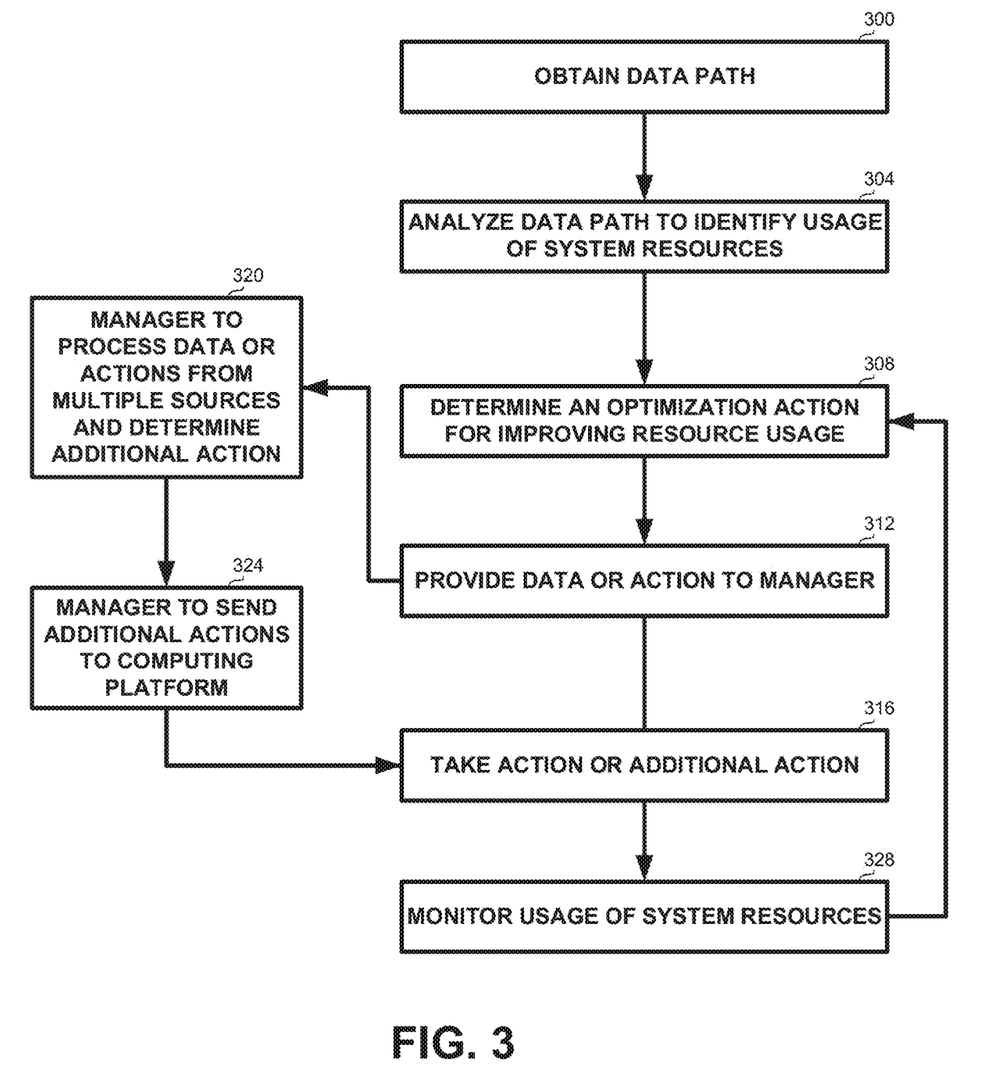
FIG. 3 shows a flowchart diagram of a method for enhancing performance in a cloud computing network, accordance with some exemplary embodiments of the disclosed subject matter.

Referring now to FIG. 3, showing a generalized flowchart of a method for enhancing performance in cloud computing systems, in accordance with the disclosure. The method may be performed by one or more agents installed on one or more computing platforms. In some exemplary embodiments, as detailed below, some parts of the method aggregate input from multiple agents executed by different computing platforms.

On step 300, a data path may be obtained. The data path may refer to a specific service or request provided by the cloud computing environment, as demonstrated in FIG. 1 and FIG. 2 above. In some embodiments, the data path may be obtained, for example from a storage device, over a communication channel, or the like.

In some exemplary embodiments, the disclosed subject matter may be agnostic to the manner in which the data path is determined. The determination may be automatic, such as using automatically obtained measurements, manual, such as manually defined by a domain-expert, or the like.

In further embodiments, the data path may be calculated upon measurements made and metrics calculated by monitoring processes within one or more computing platforms in a cloud computing environment. The measurements and metrics may be collected from a number of monitored aspects, such as but not limited to: CPU or scheduler usage, processes or threads timing, memory or disk accesses patterns, networking, API calls and system calls. In some embodiments, the data path may be calculated upon data collected by a kernel module which may be loaded into the operating system (OS), and/or a user-space library which may be loaded into the applications, wherein the module and library may set up one or more hooks of one or more types.

In some exemplary embodiments, a first hook type is a measurement hook, aimed at collecting measurements at specific locations, allowing the exposure, aggregation, and collection of metrics, and in particular unexposed metrics which are unavailable outside of the localized code area, or are not aggregated. It will be appreciated that this hook may also be operative in improving the performance of an instance or server of the network.

On step 304, the data path may be analyzed to identify events and patterns making suboptimal usage of system resources. Analyzing the data graph may provide for detecting application or operating system bottlenecks, resource usage contention, and additional phenomena, and to produce AI based inference. The analysis may identify specific information, such as lock locations throughout the data flow, formed connection points such as sockets, opened ports, or the like, Analysis may be static and refer to information gleaned without execution of the process, such as using Control Flow Graph (CFG) analysis, code analysis, or the like, as well as dynamic analysis based on data gathered through monitoring and taking measures during task executions. The analysis may comprise machine learning, wherein parts of the learning may be performed continuously in real time, while other parts may be performed at time intervals or when specific thresholds are met, such as when a predetermined number of events have been gathered. In some cases, decisions and outcomes of analysis of previously analyzed data paths, may be utilized. In some cases, based on similarity measurement of the current data path with a past data path being above a threshold, it may be decided to reuse optimization actions used in the past data path, with or without modifications.

On step 308, which may be part of analysis step 304 or a separate step, one or more optimization actions for optimizing performance of one or more tasks may be determined. The actions may he determined by the AI based inference, and may provide for adapting or modifying the logic of the application, the Operating System, or the like, in the kernel space, in the user space, or the like. The actions may have effect on any one or more areas, including but not limited to: the network stack, library and system calls, system scheduler and CPU, disk access, memory access, and the like. Some non-limiting examples of possible actions are discussed in association with FIGS. 4-6 below.

In some embodiments, further suggestions may refer to actions to be taken within one or more services or applications.

On step 312, the data path, the action determined on step 308, measurements or metrics may be provided, for example transmitted over a communication channel, stored in a database, or the like, to another platform, such as a platform of the cloud computing environment which executes a manager application.

On step 320, the manager application may receive the data paths, measurements, metrics or determined actions from the agents running on multiple platforms, and may aggregate them to detect service-wide resource usage patterns and contention that may cause bottlenecks, which could not he detected by a single agent, for example opening a sockets on either side of a connection between two hosts. In addition, the manager may determine that actions received from one agent should be applied also to another computing platform, may determine additional actions that complement determined actions, or the like.

On step 324, the actions determined by the manager may be provided to the respective computing platforms.

On step 316, the action determined on step 308, and optionally actions provided by the manager application on step 324 may be taken, as also described below, thereby improving the performance of one or more applications or services provided by the cloud computing environment. Applying the actions may include making adjustments to the operating system or one or more applications, in order to better utilize their resource consumption and gain overall performance boost. The adjustments may he dynamically applied to one or more elements of the operating system, including but not limited to the network stack, library and system calls, system scheduler and CPU, disk access and memory access.

Additionally or alternatively to the first hook type detailed above, a second hook type is an extension hook which allows running the original flow but with modifications to the parameters, additional logic which surrounds the flow, and modified repeated invocations of the flow.

Additionally or alternatively, a third hook type is a replacement hook, which enables the replacement of existing logic and algorithms with a better dynamic implementation. These implementations may expose parameters, which may be determined during the analysis stage, that dynamically influence the logic.

On step 328, the performance of the services may be continuously or periodically monitored and measured over time. The measurements may be fed back to the agent, and execution may return to step 308 for determining further actions, in order to further enhance the application performance. In some exemplary embodiments, the data obtained during Step 328 may be utilized for re-training the prediction model, to improve the AI-based inference, or the like.

Figure 4A:
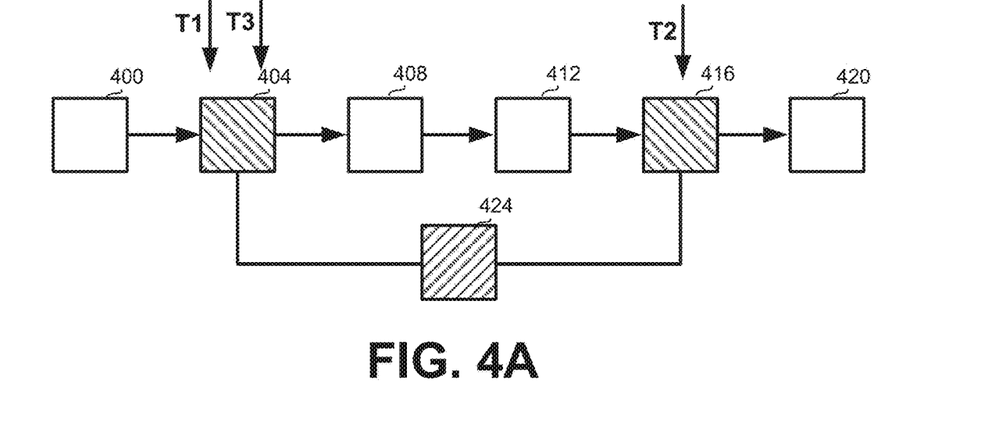
FIG. 4A and FIG. 4B illustrate a first situation and action that can be determined and taken, respectively, in accordance with some exemplary embodiments of the disclosed subject matter.
Figure 4B:
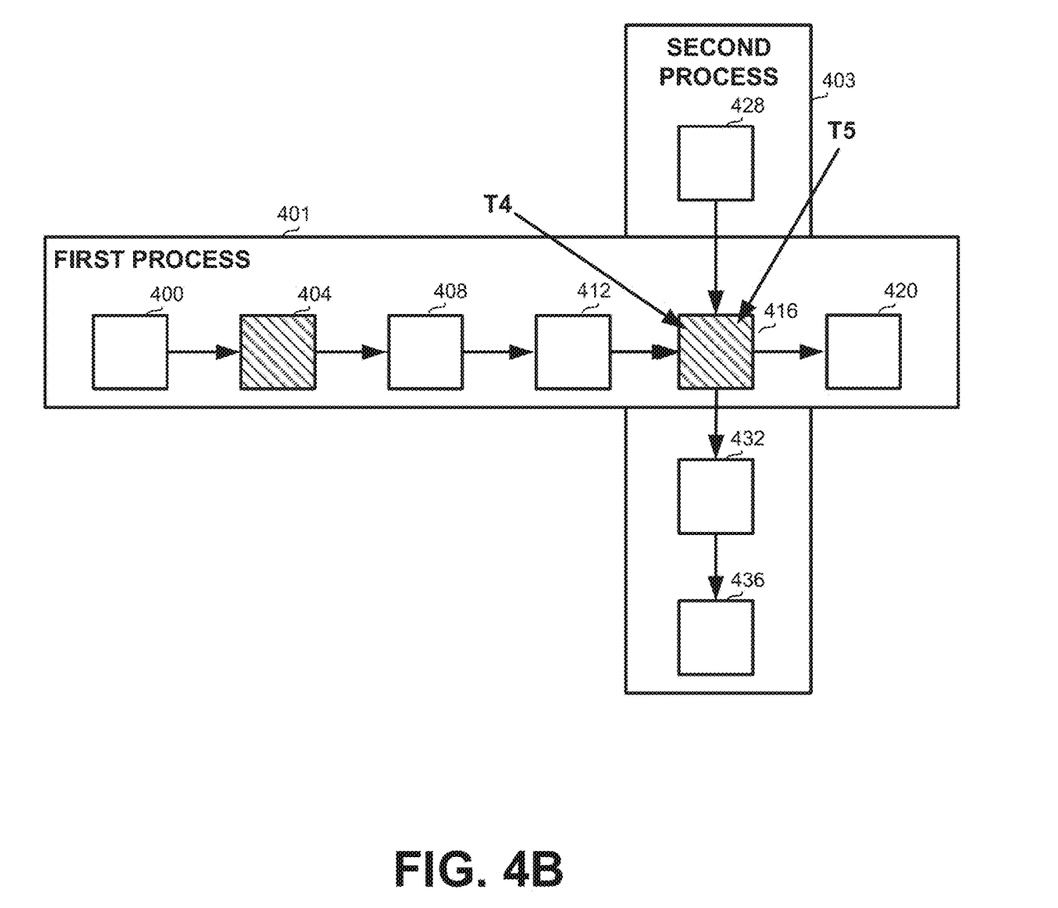

Referring now to FIG. 4A and FIG. 4B demonstrating a first situation and action that can be determined and taken, respectively for enhancing performance in a cloud computing network, in accordance with the disclosure. The first action relates to the usage and optimization of locks.

A lock may be a synchronization mechanism for enforcing limits on access to a resource in an environment with multiple execution entities (e.g., threads, processes, or the like), referred to herein as "threads". Each thread cooperates by acquiring the lock before accessing the corresponding resource, and releasing it when it is no longer required. When a thread of execution wants to acquire a lock that is currently held by another thread, it waits for the lock. During the waiting time, other processes can use the CPU or other resources of the computing platform. When the lock is released by the thread holding it, one of the other threads will be selected for execution by the OS. If the selected thread is one of the waiting threads, the selected thread will acquire the lock, which will enable it to access the resource and continue processing.

By analysing the data paths of current executed applications, lock contentions wherein multiple threads are waiting for one or more locks protecting the same resource may be detected, which detain the waiting threads. Additionally, it may he determined which thread from the threads waiting for the lock is most advanced, as detailed below. The information may be combined, and the most advanced thread may be selected, or may he assigned a higher priority which may increase its chances to be selected if additional selection considerations are involved. A thread selected or being assigned higher priority is likely to wait less time for execution, and to get relatively more CPU time at an earlier stage than other threads. Thus, the request handled by this thread is likely to be handled faster, and the resources it uses are likely to be released earlier and made available for other threads. Thus, if two threads processing service requests of a same type are awaiting locks for the same resource at different stages of processing, the optimization action may be assigning higher priority to the thread that is expected to finish processing earlier, e.g., is in a more advanced processing stage, according to the data path. Additionally or alternatively, if the two threads are at a same processing stage, the optimization action would he assigning higher priority in holding the lock to the thread that is expected to finish processing earlier, due for example to processing smaller amount of data, or other factors. Additionally or alternatively, if the two threads perform different processing operations, the one that is expected to finish its respective processing sooner, since for example it has fewer additional stages, deals with smaller amounts of data, or the like, may be assigned a higher priority.

Referring now to FIG. 4A, demonstrating options for selecting the most advanced thread. FIG. 4A shows an exemplary data path of processing an exemplary request, the data path comprising processing stages 400, 404, 408, 412, 416 and 420. The stages may be function calls, requests, or the like. Out of these stages, stages 404 and 416 comprise obtaining locks protecting a shared resource, indicated 424, for example a memory location. Determining how far a thread is from finishing execution may be determined using any metric, taking into account the number and content of processing stages yet to be done, the number and content of processing stages performed so far, the handled amount of data, or the like.

Thus, given two threads T1 and T2 processing requests as shown in the data path of FIG. 4A, if T1 is at stage 404 while T2 has reached stage 416, then thread T2 that has reached stage 416 is more likely to finish earlier, and will thus be given higher priority and is more likely to got the lock before T1. If the two threads are at the same stage, for example T1 and T3, the one that is expected to finish earlier, since it processes a lesser amount of data, or due to any other reason, may be assigned a higher priority.

FIG. 4B shows the same data path as FIG. 4A aggregated into first process 401, and an additional data path comprising stages 428, 416, 432 and 436, aggregated into second process 403. Processes 401 and 403 both require the lock at stage 416, which may happen, for example, if processes 401 and 403 call the same function, as part of their processing. If thread T4 preforming process 401 and thread T5 performing process 403 both await the lock at stage 416, the distances of the threads from finishing may be compared. The distance of T4 is the expected processing time of stage 420 while the distance of T5 is the accumulated processing time of stages 432 and 436 (assuming that both threads will spend the same time on stage 416). Alternatively, or if such information is unavailable or has significant variability, the times T4 and T5 have been processing so far, the volume of handled data may be compared, or any other metrics may be used.

However, it will be appreciated that additional or different considerations may be applied instead of selecting the thread that is expected to finish first, such as fairness, avoiding starvation, complying with service level agreement (SLA), or others, such that in some situations a less advanced thread may be assigned higher priority and may be selected. The OS may be manipulated to cause the thread scheduling module of the OS, operating in the kernel space, to select the next thread for execution in a manner that biases selection of threads that have higher priority score.

Figure 5:
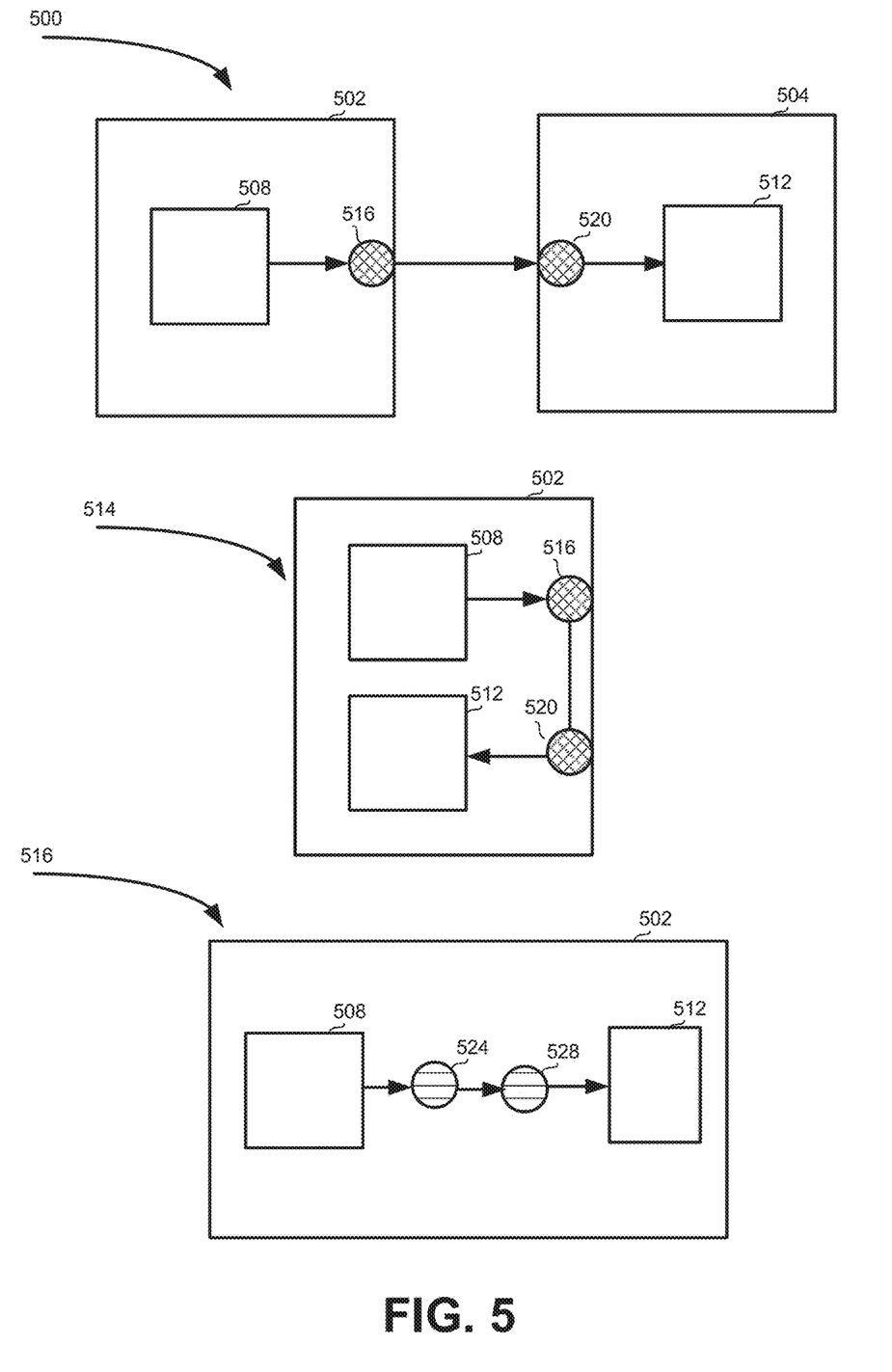
FIG. 5 illustrates a second situation and action that can be determined and taken, respectively, in accordance with some exemplary embodiments of the disclosed subject matter.

Referring now to FIG. 5, illustrating a second situation and action that can be determined and taken, respectively, for enhancing performance in a cloud computing network, in accordance with the disclosure. The second action relates to opening connection points, such as sockets.

A socket is an endpoint within a node of a computer network and is a system resource. A socket may be represented, for example, as an entry in a table, comprising communication protocol, destination, status, or the like.

On many occasions, programmers prefer to use INET sockets, which comprise an IP and port, as endpoints, to enable communication between two processes running on two servers, whether on one host or two, since INET sockets provide higher degree of portability. However, using INET sockets for communication between two processes on the same host may incur significant overhead and thus provides underperformance.

UNIX domain sockets (UDS), on the other hand, are a different type of sockets, which run locally and may only be used for communication within the same host. Since a UDS is designed for communication within the same host, it offers significant time and complexity saving over INET sockets for inter-process communications within the same host.

Inspecting connections within a data path may reveal a significant amount of inter-process communication using INET sockets between processes, although both communicating processes reside on the same machine. By changing the INET sockets on both sides of the communication into UDSs, a performance gain of the processes may be achieved, while no effort is required from the programmer of the application. The two communicating processes can continue to operate as before, and no code changes or restarting is required. In some exemplary embodiments, such a change may allow the application to support both types of sockets per each connection, depending on where the other side of the communication resides.

State 500 in FIG. 5 shows required usage of INET sockets, between process 508 running on host 502, and process 512 running on host 504. The communication thus uses INET socket 516 on host 502 and INET socket 520 on host 504.

In state 514, both processes 508 and 512 run on host 502, however the programmer still chose to use an INET sockets 516 and 520.

As shown in state 516, after realizing the situation, and determining that UDS sockets are sufficient in this case, a corresponding action may be taken, and UDS sockets 524 and 528 may be opened instead, thus gaining performance for both processes 502 and 512.

It will be appreciated that additional considerations may be applied, and in some situations not all sockets used for communication between two processes on the same host may be replaced from NET socket to UDS, depending for example on measurements related to system call (syscall) times for connection operations, such as accept(), connect(), send(), recv() and their derivatives for each connection.

It will also be appreciated that the disclosure is not limited to sockets in general, or to INET and UDS sockets in particular. Rather, the same principle may be applied towards any type of connection mechanism.

In some exemplary embodiments, the replacement of the INET by the UDS may be performed in the kernel space, when the INET socket is requested to be created. The system call handling such a request may determine to perform a different task than the one requested therefrom, by creating a different type of socket—UDS—instead.

Figure 6:
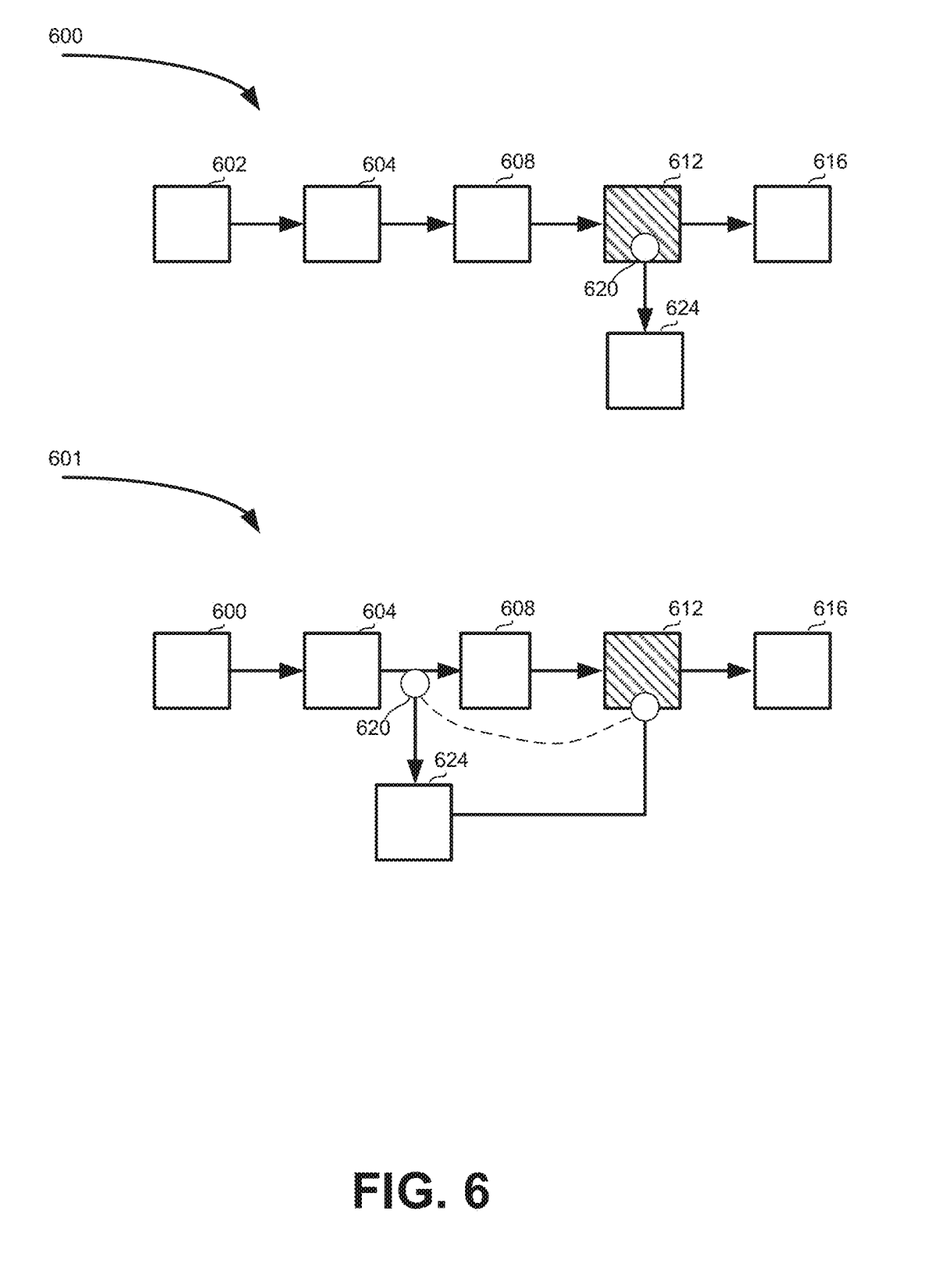
FIG. 6 illustrates a third situation and action that can be determined and taken, respectively, in accordance with some exemplary embodiments of the disclosed subject matter.

Referring now to FIG. 6, illustrating a third situation and action that can be determined and taken, respectively, for enhancing performance in a cloud computing network, in accordance with the disclosure. The third action relates to the pre-opening connection points, such as sockets.

By analysing the data paths of current executed applications and the measurements, a history may be determined for one or more outbound connection's target endpoints, including, for example:

1. Is waiting for the connection establishment blocking a request from finishing processing faster?
2. How long does a typical establishment of the connection take, and how long is the typical communication duration?
3. How frequently, or how many times is the target endpoint required?

Based on the data path and the answers to the questions above, it may be determined:
1. Which targets are being frequently connected to.
2. Which connections would make the execution flow finish faster, by eliminating a process from waiting for the establishment of a connection.
3. For which targets is the connection establishment too long, e.g. takes more than a predetermined percentage of the communication duration.

Then, since it is impossible or impractical to pre-open all connections, which may interfere with normal operation of the local and remote servers, it may be determined how many and which connections should be pre-opened, and when they should be closed. The connections may then he opened and a handle thereof may be provided one or more times to the application.

State 600 in FIG. 6 shows a data path comprising processing stages 602, 604, 608, 612 and 616, wherein on stage 612 it is required to communicate with process 624, which may be executed, for example, on another host. Normally, a connection endpoint 620 is opened when required. At that point, the process waits for the connection endpoint to open. Accordingly, the process may be stalled due to the time required to open the connection. If the connection is needed for a short time, and particularly if it is needed more than once, then since opening required at least a round trip time, the recurring openings of the connection may take up to 50% of the total communication time.

In some exemplary embodiments, an action may be taken, such that the connection will be opened earlier than requested by the application, for example between stages 604 and 608, and provided fully established without further waiting at stage 612. The connection may or may not be closed immediately afterwards, depending on whether and when it is expected to be required again.

It will be appreciated that additional considerations may be applied, and in some situations a connection endpoint may not be pre-opened, depending for example on how often and to what duration the connection is expected to be opened, the number of connections, or the like.

In some exemplary embodiments, the disclosed subject matter may disregard the instructions of the applications to close a connection, and the OS may be manipulated to deceive the application, by avoiding closing the connection, in spite of the instruction to do so, and providing return values that indicate that the connection was successfully closed.

Additionally or alternatively, the disclosed subject matter, may utilize a predictor that may be trained using monitored data, to determine a timing in which the connection is to be opened in advance. The predictor may be configured to predict, such based on the location in the data path and on execution measurements (e.g., CPU time, MEM usage, or the like), whether the connection is excepted to be utilized within a predetermined timeframe (e.g., about 1 ms, about 5 ms, about 100 ms, or the like). The predictor may be invoked repeatedly during execution, and when the prediction indicates that the connection will be used, the connection may be opened in advance. When the application invokes a command to open the connection, the OS may be modified to return the connection that was already opened. Hence, the application may remain unaware of the function that was performed. The decisions to create the pre-connection and the provisioning of the pre-connection may be performed in kernel space.

Figure 7:
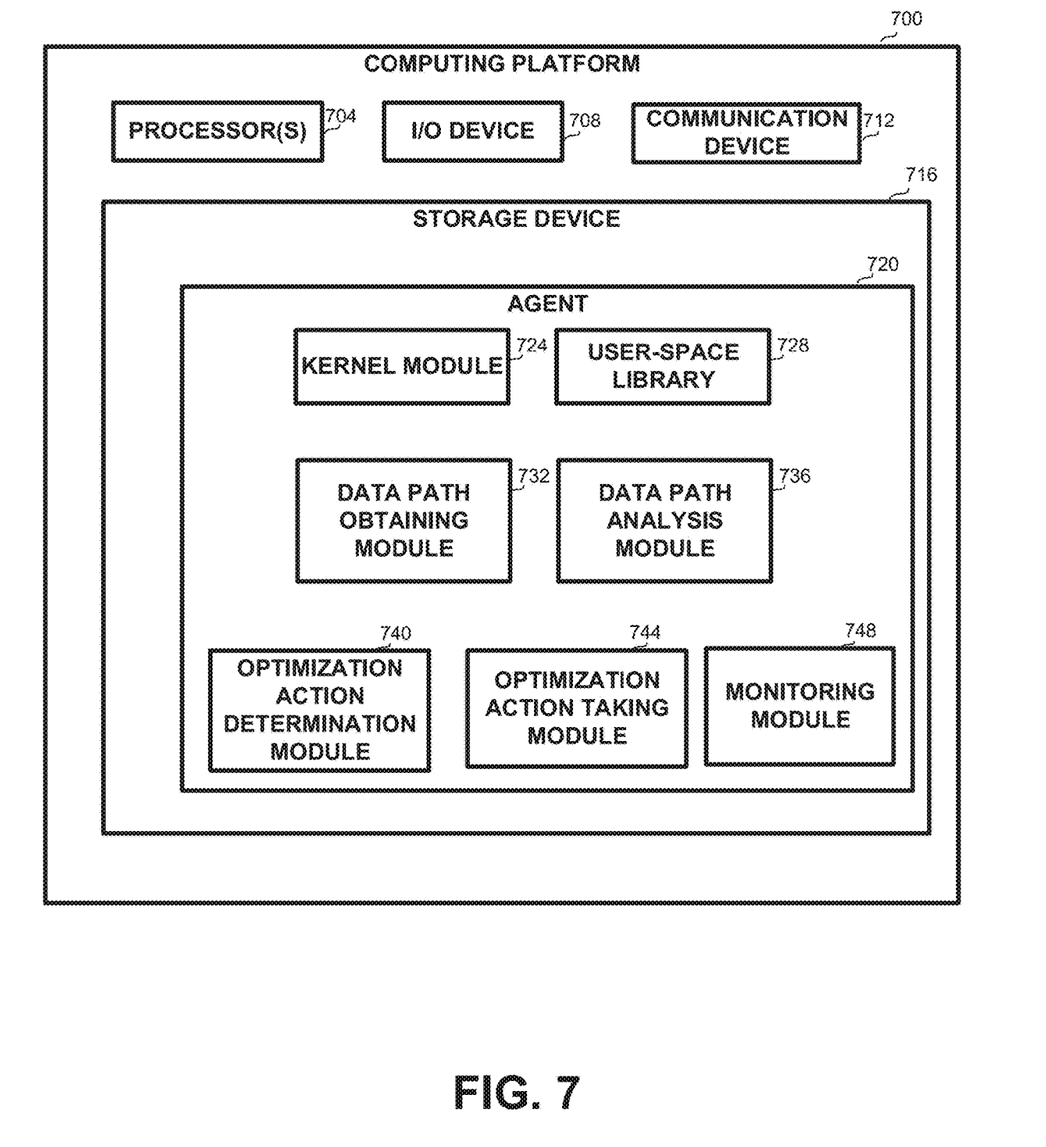
FIG. 7 is a block diagram of a system for enhancing performance in a cloud computing network, in accordance with some exemplary embodiments of the disclosed subject matter.

Referring now to FIG. 7, showing a block diagram of a system for enhancing performance in cloud computing systems, in accordance with the disclosure.

The system may comprise one or more Computing Platforms 700. In some embodiments, Computing Platform 700 may he a cloud computer, and may provide services to clients over a network. In some embodiments, Computing Platform 700 may be a part of a cloud computing network.

Computing Platform 700 may comprise a Processor 704 which may be one or more Central Processing Unit (CPU), a microprocessor, an electronic circuit, an Integrated Circuit (IC) or the like. Processor 704 may be configured to provide the required functionality, for example by loading to memory and activating the modules stored on Storage Device 712 detailed below.

It will he appreciated that Computing Platform 700 may be implemented as one or more computing platforms collocated or not, which may be in communication with one another. It will also be appreciated that Processor 704 may be implemented as one or more processors, whether located on the same platform or not.

Computing Platform 700 may also comprise Input/Output (I/O) Device 708 such as a display, a pointing device, a keyboard, a touch screen, or the like. I/O Device 708 may be utilized to receive input from and provide output to a user, for example receive configuration settings, display taken actions, display reports of saved time estimates, or the like.

Computing platform 700 may comprise Communicating Device 712 for communicating with other computing platforms, for example client computing platforms or computing platforms within the cloud, via any communication channel, such as a Wide Area Network, a Local Area Network, intranet, Internet or the like.

Computing Platform 700 may also comprise a Storage Device 716, such as a hard disk drive, a Flash disk, a Random Access Memory (RAM), a memory chip, or the like. In some exemplary embodiments, Storage Device 716 may retain program code operative to cause Processor 704 to perform acts associated with any of the modules listed below or steps of the method of FIG. 3 and the examples of FIGS. 4A, 4B, 5 and 6 above. The program code may comprise one or more executable units, such as functions, libraries, standalone programs or the like, adapted to execute instructions as detailed below.

Storage Device 716 may comprise Kernel Module 724, responsible for the real-time on-going, kernel-level collection of measurements and metrics of the activity in Computing Platform 700.

Storage Device 716 may comprise User Space Library 728, which may he loaded automatically into the client's applications, and may be responsible for the real-time collection of measurements and metrics from within the applications which run in user-space).

Kernel Module 724 and User Space Library 728 may be collectively referred to as an agent 720, installed on a computing device in a cloud computing network.

The components detailed below relate to analysis of the obtained, measured and calculated information. Each of the components detailed below may have one or more parts thereof implemented within Kernel Module 724, one or more parts thereof implemented within User Space Library 728, or one or more components implemented separately from Kernel Module 724 and User Space Library 728.

Storage Device 716 may comprise Data Path Obtaining Module 732 for obtaining one or more data paths of provided services. Data Path Obtaining Module 732 may obtain a data path form a storage device or over a communication channel. Additionally or alternatively, Data Path Obtaining Module 732 may calculate a data path based on measurements taken by Kernel Module 724 and User Space Library 728, and computations, which may include applying AI learning techniques, such as but not limited to neural networks.

Storage Device 716 may comprise Data Path Analysis Module 736, for analyzing the data path obtained by Data Path Obtaining Module 732 and optionally additional data, such as runtime measurements and metrics collected by Kernel Module 724 and User Space Library 728. The analysis may provide information about areas or events whose performance may be improved.

Storage Device 716 may comprise Optimization Action Determination Module 740 for determining one or more actions to be taken, which may improve the areas that may benefit from the performance gain, as detected by Data Path Analysis Module 736.

In some embodiments, Optimization Action Determination Module 740 may be implemented on a higher level and may aggregate information from two or more computing platforms, to determine additional actions which cannot be concluded by any single computing platform. These actions may be transmitted to the computing platforms and acted upon by Optimization Action Taking Module 744 detailed below.

Storage Device 716 may comprise Optimization Action Taking Module 744, for implementing the actions determined by Optimization Action Determination Module 740. It will be appreciated that the actions, as exemplified above, may be taken by the operating system, for example switching socket type, changing lock priorities, or the like, and do not require programming intervention in the running applications.

Storage Device 716 may comprise Monitoring Module 748, for monitoring the behavior before or after the actions, take additional measures and optionally change, add, or stop any of the actions.

The present disclosed subject matter may be a system, a method, and/or a computer program product. The computer program product may include a computer readable storage medium (or media) having computer readable program instructions thereon for causing a processor to carry out aspects of the disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the disclosed subject matter.

Aspects of the disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, hut do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosed subject matter has been presented for purposes of illustration and description, but is not intended to be exhaustive or limited to the invention in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method comprising:
   identifying a data path representing a flow of data used for processing a service request within a computing platform of a network computing environment, wherein the data path is a representation of how data is moved throughout services in the computing platform, wherein the computing platform hosts a software environment including an operating system and applications within the operating system, and wherein the computing platform includes system resources that control communication within the software environment among the operating system and the applications;

monitoring the flow of data in the computing platform, to identify usage patterns of the system resources of the computing platform by the operating system and the applications in the software environment for the processing of the service request, wherein the monitoring of the flow of data is performed using at least one of: an Application Programming Interface (API) call, a system call, or a hook;

determining, based on the usage patterns of the system resources of the computing platform, a configuration action to improve the usage patterns of the system resources by the computing platform, wherein the configuration action causes a change to prioritization of requests from the operating system and the applications to access the system resources, which modifies the flow of data among the operating system or the applications in the software environment; and implementing the configuration action within the software environment, to modify an operation of the computing platform in handling future service requests.

2. The method of claim 1, further comprising:
monitoring continuous usage of the system resources over time;
determining a second configuration action other than the configuration action, based on the continuous usage and the data path; and
implementing the second configuration action, to further modify the operation of the computing platform in handling the future service requests.

3. The method of claim 1, wherein the computing platform is a server having the operating system executed therein, wherein the server is involved in the processing of the service request, and wherein implementing the configuration action comprises manipulating the operating system.

4. The method of claim 1, wherein the configuration action is implemented in a kernel space of the operating system, and wherein the change to the prioritization of the requests includes changes to priorities of threads in the kernel space of the operating system.

5. The method of claim 1, wherein the operating system defines a kernel space and a user space, wherein the configuration action is implemented in the user space, and wherein the change to the prioritization of the requests includes changes to priorities of threads in the user space of the operating system.

6. The method of claim 1, wherein the network computing environment is a cloud computing environment.

7. The method of claim 1, wherein the network computing environment is an on-premise computing environment.

8. The method of claim 1, wherein monitoring the flow of data is performed by an agent executed in the software environment on the computing platform, wherein said determining of the configuration action and the implementing of the configuration action are performed by the agent, and wherein the agent is configured to attempt an improvement to the usage patterns of the system resources of the computing platform.

9. The method of claim 8, wherein the agent operates independently from other computing platforms in the network computing environment in a standalone configuration, whereby a local configuration of the system resources of the computing platform is attempted.

10. The method of claim 1, wherein monitoring the flow of data is performed based on resource utilization measurements of the computing platform and without obtaining resource utilization measurements of other computing platforms in the network computing environment.

11. A computing platform, comprising:
a network interface to receive a service request; and
at least one processor configured to:
identify a data path representing a flow of data used for processing the service request within the computing platform, wherein the data path is a representation of how data is moved throughout services in the computing platform, wherein the computing platform hosts a software environment including an operating system and applications within the operating system, and wherein the computing platform includes system resources that control communication within the software environment among the operating system and the applications;
monitor the flow of data in the computing platform, to identify usage patterns of the system resources of the computing platform by the operating system and the applications in the software environment for the processing of the service request, wherein the monitoring of the flow of data is performed using at least one of: an Application Programming Interface (API) call, a system call, or a hook;
determine, based on the usage patterns of the system resources of the computing platform, a configuration action to improve the usage patterns of the system resources by the computing platform, wherein the configuration action causes a change to prioritization of requests from the operating system and the applications to access the system resources, which modifies the flow of data among the operating system or the applications in the software environment; and
implement the configuration action within the software environment, to modify an operation of the computing platform in handling future service requests.

12. The computing platform of claim 11, wherein the at least one processor is further configured to:
monitor continuous usage of the system resources over time;
determine a second configuration action other than the configuration action, based on the continuous usage and the data path; and
implement the second configuration action, to further modify the operation of the computing platform in handling the future service requests.

13. The computing platform of claim 11, wherein the computing platform is a server having the operating system executed therein, wherein the server is involved in the processing of the service request, and wherein to implement the configuration action includes to manipulate the operating system.

14. The computing platform of claim 11, wherein the configuration action is implemented in a kernel space of the operating system, and wherein the change to the prioritization of the requests includes changes to priorities of threads in the kernel space of the operating system.

15. The computing platform of claim 11, wherein the operating system defines a kernel space and a user space, wherein the configuration action is implemented in the user space, and wherein the change to the prioritization of the requests includes changes to priorities of threads in the user space of the operating system.

16. At least one non-transitory computer readable medium, comprising a plurality of instructions that, responsive to being executed with at least one processor, cause the at least one processor to:
   identify a data path representing a flow of data used for processing a service request within a computing platform of a network computing environment, wherein the data path is a representation of how data is moved throughout services in the computing platform, wherein the computing platform hosts a software environment including an operating system and applications within the operating system, and wherein the computing platform includes system resources that control communication within the software environment among the operating system and the applications;
   monitor the flow of data in the computing platform, to identify usage patterns of the system resources of the computing platform by the operating system and the applications in the software environment for the processing of the service request, wherein the monitoring of the flow of data is performed using at least one of: an Application Programming Interface (API) call, a system call, or a hook;
   determine, based on the usage patterns of the system resources of the computing platform, a configuration action to improve the usage patterns of the system resources by the computing platform, wherein the configuration action causes a change to prioritization of requests from the operating system and the applications to access the system resources, which modifies the flow of data among the operating system or the applications in the software environment; and
   implement the configuration action within the software environment, to modify an operation of the computing platform in handling future service requests.

17. The at least one non-transitory computer readable medium of claim 16, wherein the instructions further cause the at least one processor to:
   monitor continuous usage of the system resources over time;
   determine a second configuration action other than the configuration action, based on the continuous usage and the data path; and
   implement the second configuration action, to further modify the operation of the computing platform in handling the future service requests.

18. The at least one non-transitory computer readable medium of claim 16, wherein the computing platform is a server having the operating system executed therein, wherein the server is involved in the processing of the service request, wherein to implement the configuration action comprises to manipulate the operating system, wherein the configuration action is implemented in a kernel space or in a user space of the operating system, and wherein the change to the prioritization of the requests includes changes to priorities of threads in the kernel space or in the user space of the operating system.

* * * * *